Oct. 2, 1934.   G. M. L. VAN H. HUBAR   1,975,490
EYEGLASSES
Original Filed July 7, 1932
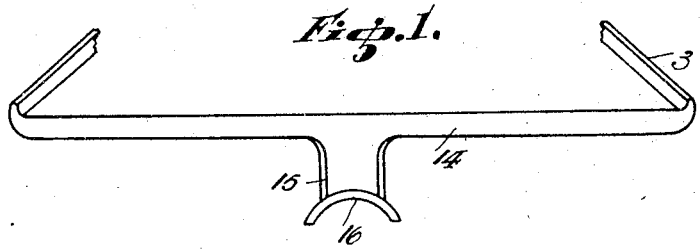
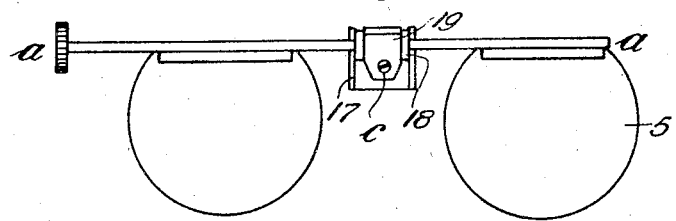
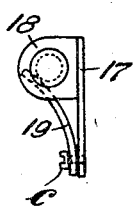
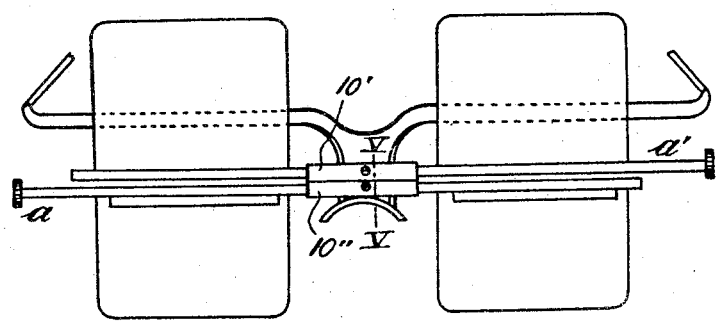
Inventor
Guillaume Marie Louis
van Hellenberg Hubar.
per J. Gevers
Attorney

# UNITED STATES PATENT OFFICE 1,975,490

EYEGLASSES

Guillaume Marie Louis van Hellenberg Hubar, Wassenaar, Netherlands

Application July 7, 1932, Serial No. 621,166.
Renewed July 12, 1934. In Belgium May 30, 1932

2 Claims. (Cl. 88—41)

The present invention consists in an eye-glass with tiltable lenses, the main characteristic of which resides in the fact that the lenses are mounted upon a preferably rectilinear rod, which is rotatably mounted and supported by the bridge element of the eye-glass.

The lenses are preferably slidably or adjustably and removably mounted upon said rod, so that they can be adjusted with respect to the distance separating the eyes.

The invention will be described in different forms of embodiment and with reference to the accompanying drawing.

Figs. 1 and 2 illustrate, in front view, separate elements of a form of embodiment of the invention, wherein a particular bridge element is shown and to which the rotatable rod bearing the lenses is easily suspended.

Fig. 3 is a side view of a detail of Fig. 2;

Fig. 4 shows a form of embodiment having two sets of tiltable lenses;

Fig. 5 is a section on line V—V of Fig. 4.

In the form of embodiment illustrated in Figs. 1 and 2, there is provided a main set or bridge piece 14 of appropriate length, having temples 3 and from which depends, in the central portion, a guide element 15 arranged at right angles to the bridge forming strip; this guide element has a support 16 engaging the nose. The lens supporting rod $a$ bears in the central portion a plate 17, adjustably engaging the guide-way 15 and which can be easily slid within said guide-way and removed therefrom, whereby it is possible to adjust the sets of fixed or movable lenses according to the position of the eyes with respect to the nose, so that the eyes will be exactly in the central part of the lenses. The rod $a$ passes through bearings 18 forming part of the plate 17, and the pressure upon the rod $a$ is obtained by means of a spring blade 19, which can be brought under tension by means of the screw $c$. The rod $a$ has also a portion of small diameter engaged by said spring blade to prevent axial movement thereof. The lenses are pressed in clamps which are fixed to the rod $a$.

The invention not only refers to eye-glasses having a set of movable and adjustable lenses, but also to eye-glasses having an ordinary set of fixed lenses and a set of movable lenses, and also to the combination of a plurality of pairs of tiltable lenses.

The constructional detail of eye-glasses having multiple sets of tiltable lenses does not present difficulties to the man skilled in the art.

In Fig. 4 is illustrated an eye-glass having two sets of tiltable lenses, the rotary rods $a$, $a'$ of which are mounted in tubes 10′, 10″, said tubes being at variable distances from the supporting plate, 17 of the bridge, so that the lenses of those two sets can be brought in parallel and normal position in front of the eyes.

The advantage of the present invention consists in the simplicity, strength and easy manipulation of the eye-glasses. The upkeep of eyeglasses of this kind is easy and the frictional resistance necessary to hold the rod $a$ in the tilted position of the lenses can be easily adjusted by screwing down the screw $c$.

The combination of sets of coloured lenses is obvious and comprised in the scope of the claims hereafter.

I claim:

1. In an eye-glass, a bridge element engaging the nose, a strip with temple on either side of said bridge element, a plate engaging substantially vertical guide-ways provided on the bridge element, bearings on said plate, a rod engaging the bearings, a pressure plate engaging the rod intermediate the bearings, and a pair of lenses mounted in spaced relation on said rod and slidably engaging channeled clamps forming part with the rod.

2. An article of the class described, comprising a bridge element engaging the nose, a strip with temple on either side of the bridge element, a plate engaging substantially vertical guide-ways provided on the bridge element, at least two pairs of bearings on said plate, rods engaging the pairs of bearings in substantially parallel arrangement, pressure means for holding the rods in variable positions when rotated, and pairs of lenses mounted in spaced relation on said rods and slidably engaging channeled clamps forming part with the rods.

GUILLAUME MARIE LOUIS
VAN HELLENBERG HUBAR.